(12) United States Patent
Yamamoto et al.

(10) Patent No.: US 12,516,958 B2
(45) Date of Patent: Jan. 6, 2026

(54) MAGNETIC MARKER DETECTION METHOD AND SYSTEM

(71) Applicant: Aichi Steel Corporation, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai - shi (JP)

( * ) Notice: Subject to any disclaimer, the term of this patent is extended or adjusted under 35 U.S.C. 154(b) by 344 days.

(21) Appl. No.: 18/284,299

(22) PCT Filed: Mar. 24, 2022

(86) PCT No.: PCT/JP2022/014132
§ 371 (c)(1),
(2) Date: Sep. 27, 2023

(87) PCT Pub. No.: WO2022/210297
PCT Pub. Date: Oct. 6, 2022

(65) Prior Publication Data
US 2024/0167846 A1    May 23, 2024

(30) Foreign Application Priority Data
Apr. 1, 2021  (JP) .................................. 2021-062783

(51) Int. Cl.
*G01D 5/14*    (2006.01)
(52) U.S. Cl.
CPC ...................... *G01D 5/14* (2013.01)
(58) Field of Classification Search
USPC ......................................................... 73/146
See application file for complete search history.

(56) References Cited

U.S. PATENT DOCUMENTS

| | | | |
|---|---|---|---|
| 12,038,757 B2 * | 7/2024 | Yamamoto | G05D 1/0259 |
| 2015/0247719 A1 * | 9/2015 | Huang | B62D 15/025 |
| | | | 701/41 |

(Continued)

FOREIGN PATENT DOCUMENTS

| | | |
|---|---|---|
| EP | 3467437 A1 | 4/2019 |
| JP | 2001-143193 A | 5/2001 |

(Continued)

OTHER PUBLICATIONS

International Search Report and Written Opinion mailed on Jun. 14, 2022, received for PCT Application PCT/JP2022/014132, filed on Mar. 24, 2022, 8 pages including English Translation.

*Primary Examiner* — Walter L Lindsay, Jr.
*Assistant Examiner* — Warren K Fenwick
(74) *Attorney, Agent, or Firm* — XSENSUS LLP

(57) ABSTRACT

In a marker detection system for a vehicle including a magnetic sensor to detect a magnetic marker laid in a road surface, the magnetic sensor can measures, for each axis, magnitudes of magnetic components acting along an axis in a vertical direction and an axis in a forwarding direction, and a detection unit identifies a candidate zone to which a possibility that the magnetic marker belongs is high, based on a change in a forwarding direction of the vehicle of a magnetic measurement value along any of the axes and determines whether the magnetic marker has been detected in accordance with a degree of synchronization between a first signal indicating a change of a magnetic measurement value regarding one axis in the candidate zone and a second signal indicating a change of a magnetic measurement value regarding the other axis in the candidate zone.

18 Claims, 11 Drawing Sheets

(56) References Cited

U.S. PATENT DOCUMENTS

| | | | | |
|---|---|---|---|---|
| 2018/0283904 A1* | 10/2018 | Yamamoto | ............... | G05D 1/02 |
| 2020/0320870 A1* | 10/2020 | Yamamoto | ............. | G08G 1/042 |
| 2020/0340825 A1* | 10/2020 | Yamamoto | ......... | G01C 21/3679 |
| 2021/0149414 A1* | 5/2021 | Yamamoto | ........... | G05D 1/0261 |
| 2022/0120710 A1* | 4/2022 | Yamamoto | ................ | G06T 7/13 |
| 2023/0250598 A1* | 8/2023 | Yamamoto | ............. | E01F 9/512 |
| | | | | 701/23 |

FOREIGN PATENT DOCUMENTS

| | | |
|---|---|---|
| JP | 2005-202478 A | 7/2005 |
| JP | 2019-002772 A | 1/2019 |
| WO | 2020/171232 A1 | 8/2020 |

\* cited by examiner

MAGNETIC MARKER DETECTION METHOD AND SYSTEM

CROSS-REFERENCE TO RELATED APPLICATIONS

The present application is based on PCT filing PCT/JP2022/014132, filed Mar. 24, 2022, which claims priority to Japanese Patent Application No. 2021-062783, filed Apr. 1, 2021, the entire contents of each are incorporated herein by reference.

TECHNICAL FIELD

The present invention relates to a method and system of detecting magnetic markers laid in or on a traveling road for a vehicle.

BACKGROUND ART

Conventionally, magnetic marker detection systems for vehicles for using magnetic markers laid in a road for vehicle control have been known (for example, refer to Patent Literature 1). By using this magnetic marker detection system to detect, for example, magnetic markers laid along a lane by a vehicle's magnetic sensor or the like, various driving assists can be achieved, such as automatic steering control, lane departure warning, and automatic driving.

CITATION LIST

Patent Literature

Patent Literature 1: Japanese Unexamined Patent Application Publication No. 2005-202478

SUMMARY OF INVENTION

Technical Problem

However, the above-described conventional magnetic marker detection systems have the following problem. That is, there is a problem in which reliability of magnetic marker detection may be impaired due to various external disturbances of magnetism acting on the magnetic sensors or the like. For example, a vehicle traveling alongside and a vehicle passing oppositely can become a generation source of external disturbance of magnetism.

The present invention was made in view of the above-described conventional problem, and is to provide a magnetic marker detection method and system with high detection reliability.

Solution to Problem

One mode of the present invention resides in a magnetic marker detection method for detecting, while a vehicle including a magnetic sensor is moving on a traveling road, a magnetic marker laid in or on a road surface forming a surface of the traveling road,
the magnetic sensor capable of measuring magnitudes of magnetic components acting along a plurality of axes including at least two axes, for each of the plurality of axes,
the magnetic marker detection method including:
a first process of identifying a candidate zone, which is a temporal or spatial zone to which a possibility that the magnetic marker belongs is high, based on a change in a forwarding direction of the vehicle of a magnitude of a magnetic component along at least any axis of the plurality of axes; and
a second process of determining whether the magnetic marker has been detected in the candidate zone in accordance with a degree of synchronization between a first signal indicating a change of a magnitude of a magnetic component acting along one axis of the at least two axes in the candidate zone and a second signal indicating a change of a magnitude of a magnetic component acting along an other axis in the candidate zone.

One mode of the present invention resides in a system for a vehicle including a magnetic sensor to detect a magnetic marker laid in or on a road surface forming a surface of a traveling road,
the magnetic sensor capable of measuring magnitudes of magnetic components acting along a plurality of axes including at least two axes, for each of the plurality of axes,
the system including:
a first circuit which identifies a candidate zone, which is a temporal or spatial zone to which a possibility that the magnetic marker belongs is high, based on a change in a forwarding direction of the vehicle of a magnitude of a magnetic component along at least any axis of the plurality of axes; and
a second circuit which determines whether the magnetic marker has been detected in the candidate zone in accordance with a degree of synchronization between a first signal indicating a change of a magnitude of a magnetic component acting along one axis of the at least two axes in the candidate zone and a second signal indicating a change of a magnitude of a magnetic component acting along an other axis in the candidate zone.

Advantageous Effects of Invention

In the present invention, it is assumed that a vehicle including a magnetic sensor capable of measuring, for each axis, the magnitudes of the magnetic components acting along the plurality of axes including at least two axes. The present invention has one technical feature in a combination of the first process or circuit of identifying a candidate zone to which a possibility that the magnetic marker belongs is high and the second process or circuit of determining whether the magnetic marker has been detected in the candidate zone.

The first process or circuit identifies the candidate zone based on a change in the forwarding direction of the magnitude of the magnetic component along at least any axis of the plurality of axes. The second process or circuit determines whether the magnetic marker has been detected in accordance with the degree of synchronization between the first signal indicating a change of the magnitude of the magnetic component acting along one axis of the at least two axes in the candidate zone and the second signal indicating a change of the magnitude of the magnetic component acting along an other axis in the candidate zone.

In the present invention, first, a candidate zone to which a possibility that the magnetic marker belongs is high is identified. Then, as for the candidate zone to which a possibility that the magnetic marker belongs is high, by using the degree of synchronization between the first signal and the second signal, it is determined whether the magnetic marker has been detected. In this manner, according to the present invention, with two steps provided, a step of identifying a candidate zone and a step of determining whether the magnetic marker has been detected in this candidate zone, reliability of magnetic marker detection can be improved.

DESCRIPTION OF EMBODIMENTS

Figure 1:
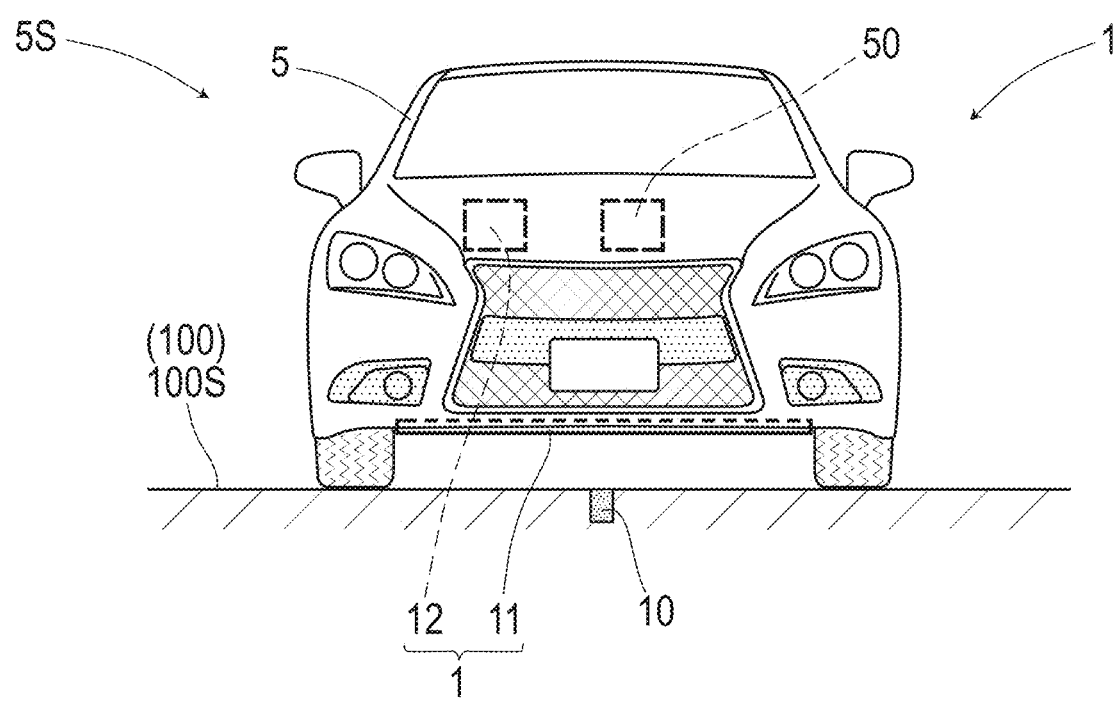
FIG. 1 is a front view depicting a state in which a vehicle detects a magnetic marker in a first embodiment.

Embodiments of the present invention are specifically described by using the following embodiments.

First Embodiment

The present embodiment is an example regarding detection method and system 1 for detecting magnetic marker 10 laid in a road. Details of this are described by using FIG. 1 to FIG. 11.

The present embodiment is an example in which marker detection system (one example of a system) 1 for detecting magnetic marker 10 is applied to driving assist system 5S allowing lane keeping traveling. Driving assist system 5S is configured to include vehicle ECU 50 which controls a steering actuator, not depicted, for steered wheels to be steered, a throttle actuator for adjusting engine outputs, and so forth. Vehicle ECU 50 controls vehicle 5 so that, for example, a lateral shift amount with respect to magnetic marker 10 is made closer to zero to achieve lane keeping traveling.

Marker detection system 1 is configured of a combination of sensor unit 11 including magnetic sensors Cn (n is an integer of 1 to 15) and detection unit 12 which executes a marker detection process for detecting magnetic marker 10.

In the following, after magnetic marker 10 is generally described, sensor unit 11 and detection unit 12 configuring magnetic marker detection system 1 are described.

Magnetic marker 10 is a marker for roads to be laid along the center of lane 100 forming a traveling road of vehicle 5 for, for example, every 2 m. This magnetic marker 10 forms a columnar shape having a diameter of 20 mm and a height of 28 mm, and can be accommodated in a hole provided in road surface 100S. Magnetic marker 10 is a ferrite plastic magnet, which is a permanent magnet with magnetic powder of iron oxide as a magnetic material dispersed in a polymer material as a base material. Note that, for example, a resin mold layer may be provided on the entire or part of the surface of magnetic marker 10 as the ferrite plastic magnet itself.

The maximum energy product (BHmax) of the ferrite plastic magnet forming magnetic marker 10 is 6.4 kJ/m$^3$. Also, the magnetic flux density of an end face of magnetic marker 10 is 45 mT (milliteslas). Here, as a vehicle using the magnetic marker, any of various vehicle types can be thought, such as passenger vehicles and trucks. The attachment height of the magnetic sensors depends on the ground height for each vehicle type, and a range of 100 mm to 250 mm is generally assumed. Magnetic marker 10 can act with magnetism having a magnetic flux density of 8 µT (8×10−6 T) at a position with a height of 250 mm, which is equivalent to an upper limit of the range assumed as the attachment height of magnetic sensors Cn.

Next, sensor unit 11 and detection unit 12 configuring marker detection system 1 are described.

Figure 2:
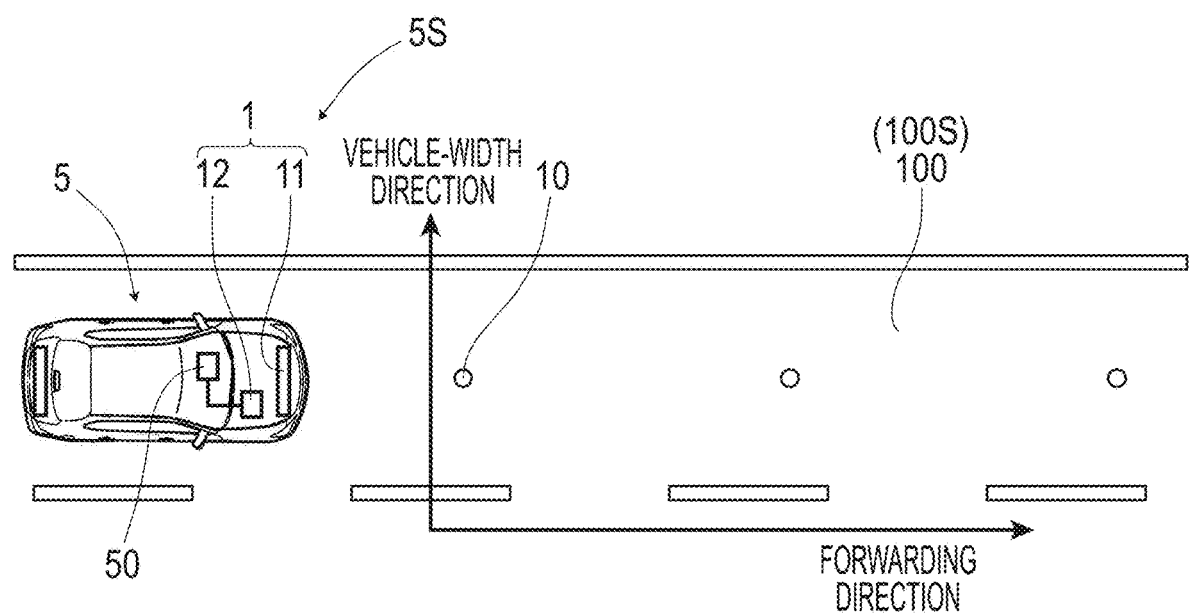
FIG. 2 is a top view depicting a vehicle traveling a lane where magnetic markers are laid in the first embodiment.
Figure 3:
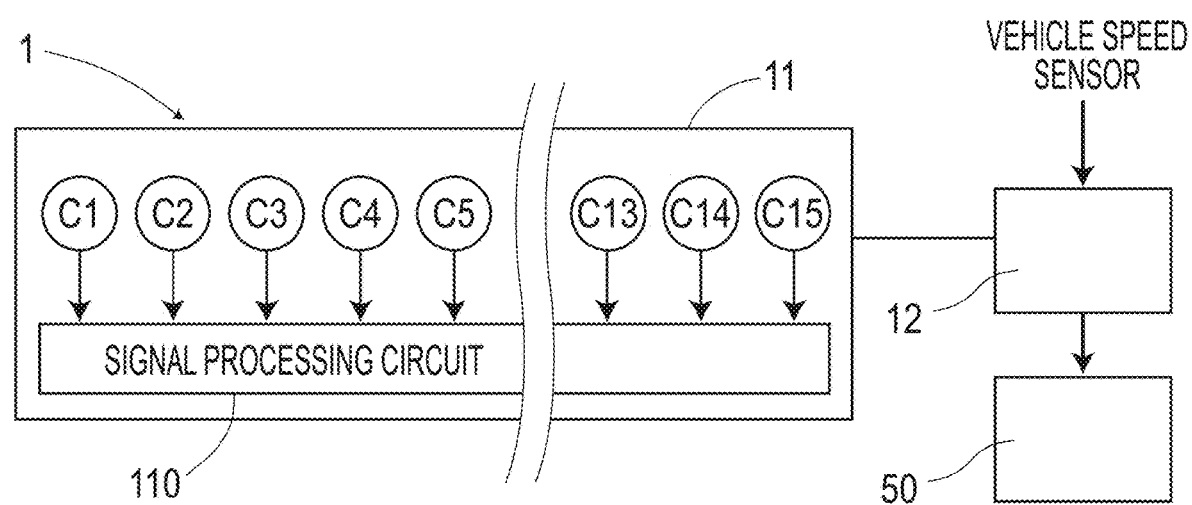
FIG. 3 is a configuration diagram of a marker detection system in the first embodiment.

Sensor unit 11 is, as in FIG. 1 to FIG. 3, a rod-shaped unit with fifteen magnetic sensors C1 to C15 arrayed on a straight line. The pitch among fifteen magnetic sensors C1 to C15 is an equal pitch of 10 cm. In a state in which a longitudinal direction is along a vehicle-width direction, sensor unit 11 is attached, for example, inside the front bumper of vehicle 5. In the case of vehicle 5 of the present embodiment, the attachment height of sensor unit 11 with reference to road surface 100S is 200 mm. Sensor unit 11 is configured to include a combination of fifteen magnetic sensors Cn and signal processing circuit 110 having incorporated therein a CPU and so forth not depicted (FIG. 3).

Magnetic sensors Cn are sensors which detect magnetism by using the known MI effect (Magneto Impedance Effect) in which the impedance of a magneto-sensitive body such as an amorphous wire sensitively changes in response to the external magnetic field. Magnetic sensors Cn detect a magnetic component acting along a magneto-sensitive body such as an amorphous wire, and output a sensor signal indicating the magnitude (magnetic measurement value) of that magnetic component.

Magnetic sensors Cn are highly-sensitive sensors with a measurement range of magnetic flux density of ±0.6 milliteslas and a magnetic flux resolution of 0.02 microteslas in the measurement range. As described above, magnetic marker 10 can act with magnetism having magnetic flux density equal to or larger than 8 µT (8×10−6 T) in a range of 100 mm to 250 mm assumed as an attachment height of magnetic sensors Cn. With magnetic marker 10 acting with magnetism having magnetic flux density equal to or larger than 8 µT, detection can be made with high reliability by using magnetic sensors Cn having the magnetic flux resolution of 0.02 µT.

Note that magnetic sensors Cn of the present embodiment each have paired magneto-sensitive bodies orthogonal to each other so as to detect magnetic components acting in biaxial directions orthogonal to each other. Each magnetic sensor Cn is incorporated in sensor unit 11 so that the directions of the paired magneto-sensitive bodies are the same. Sensor unit 11 is attached to vehicle 5 so that each magnetic sensor Cn can detect magnetic components acting along the axis in a forwarding direction (one axis) and magnetic components acting along the axis in a vertical direction (the other axis, axis orthogonal to the forwarding direction).

Signal processing circuit 110 (FIG. 3) is a circuit which performs signal processing such as noise removal and amplification on the sensor signal of each magnetic sensor Cn. Signal processing circuit 110 captures a sensor signal of each magnetic sensor Cn every time vehicle 5 advances a predetermined amount (for example, 5 cm), and generates a corresponding magnetic measurement value for input to detection unit 12. Note that signal processing circuit 110 generates, as described above, a magnetic measurement value (Gv) indicating the magnitude of a magnetic component acting along the axis in the vertical direction and a magnetic measurement value (Gt) indicating the magnitude of a magnetic component acting along the axis in the forwarding direction. In the following description, they are described as magnetic measurement values of the magnetic sensor, as appropriate.

Detection unit 12 is the circuit which controls sensor unit 11 and performs the marker detection process, which is an arithmetic process for detecting magnetic marker 10. Detection unit 12 has a circuit substrate with a CPU (central processing unit) which performs various arithmetic operations, memory elements such as a ROM (read only memory) and a RAM (random access memory), and so forth implemented thereon.

In a storage area of the RAM, a work area for storing time-series magnetic measurement values of each magnetic sensor Cn is formed. By using this work area, detection unit 12 stores the time-series magnetic measurement values over a previous predetermined distance (for example, 10 m) corresponding to movement history of vehicle 5.

To detection unit 12, a signal line of a vehicle speed sensor included in vehicle 5 is connected. The vehicle speed sensor is a sensor which outputs a pulse signal every time the wheels rotate for a predetermined amount. As a predetermined amount, for example, there are a predetermined angle such as 1 degree, 10 degree, or 30 degree, a predetermined distance such as 1 cm, 5 cm, or 10 cm, and so forth. Detection unit 12 of the present embodiment controls sensor unit 11 so that it outputs magnetic measurement values (Gv, Gt) every time vehicle 5 advances by 5 cm.

Detection unit 12 reads the magnetic measurement values (Gt, Gv) by each magnetic sensor Cn stored in the work area of the RAM described above to perform the marker detection process and so forth. The results of the marker detection process by detection unit 12 includes the fact that magnetic marker 10 has been detected, as well as the detected lateral shift amount with respect to magnetic marker 10. Detection unit 12 performs the marker detection process every time vehicle 5 advances (moves) by 5 cm, and inputs the detection result of the marker detection process to vehicle ECU 50. As described above, the detection results by detection unit 12 are used for various controls on vehicle 5 side, such as automatic steering control, lane departure warning, and automatic driving for lane keeping. Note that while the configuration is exemplarily described in the present embodiment in which the marker detection process is performed once every time vehicle 5 advances by 5 cm, the marker detection process may be repeatedly performed at a frequency of, for example, 3 kHz.

Detection unit 12 includes functions as the following respective circuits (means).

(a) First circuit: Based on a change in the forwarding direction of vehicle 5 of the magnetic measurement value (Gt) in the forwarding direction, a candidate zone to which a possibility that magnetic marker 10 belongs is high is identified (first process). Note that the candidate zone may be a temporal zone interposed between two time points or a spatial zone between two locations.

(b) Second circuit: It is determined whether magnetic marker 10 has been detected in the candidate zone (second process). The second circuit performs the above-described determination in accordance with the degree of synchronization between a first signal indicating a change of the magnetic measurement value (Gv) in the vertical direction in the candidate zone and a second signal indicating a change of the magnetic measurement value (Gt) in the forwarding direction in the candidate zone.

Figure 4:
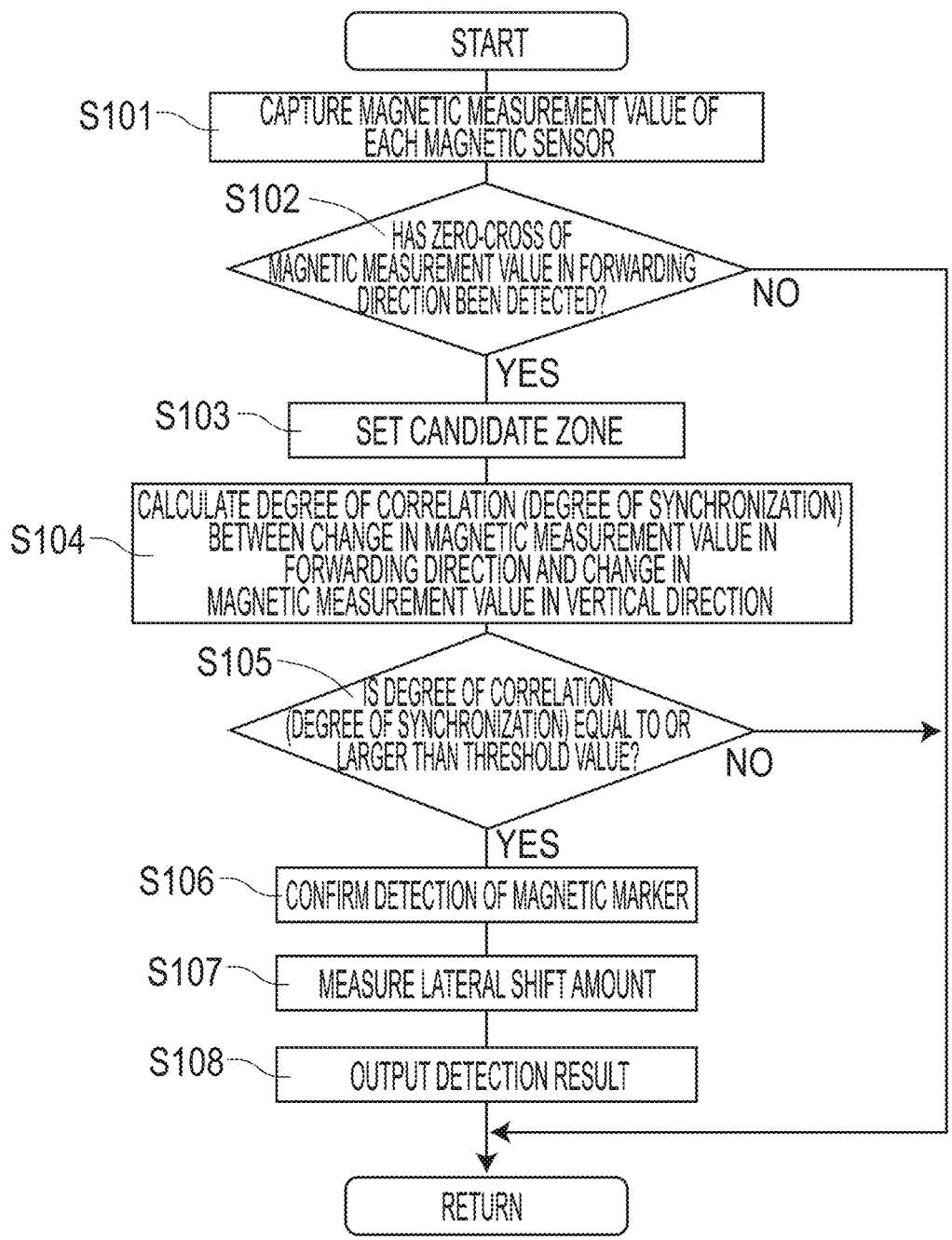
FIG. 4 is a flow diagram depicting a flow of a marker detection process in the first embodiment.

The operation of marker detection system 1 configured as described above is described with reference to a flow diagram of the marker detection process of FIG. 4. This marker detection process is a process to be performed by marker detection system 1 every time vehicle 5 advances by 5 cm. In the following, details of the marker detection process are described by mainly describing the operation of detection unit 12.

Detection unit 12 captures the magnetic measurement value of each magnetic sensor Cn of sensor unit 11 every time vehicle 5 advances by 5 cm. Note that detection unit 12 detects that vehicle 5 has advanced by 5 cm by processing a pulse signal inputted from the vehicle speed sensor. As the magnetic measurement value of each magnetic sensor Cn, detection unit 12 captures the magnetic measurement value indicating the magnitude of the magnetic component in the forwarding direction (magnetic measurement value in the forwarding direction, Gt) and the magnetic measurement value indicating the magnitude of the magnetic component in the vertical direction (magnetic measurement value in the vertical direction, Gv) (S101). Detection unit 12 writes the magnetic measurement values (Gt, Gv) of each magnetic sensor Cn captured from sensor unit 11 in the work area (storage area of the RAM) as occasion arises. Here, while the latest magnetic measurement values (Gt, Gv) are newly stored, the oldest magnetic measurement values (Gt, Gv) are erased. With this, for each magnetic sensor Cn, previous time-series magnetic measurement values (Gt, Gv) for 10 mare stored and retained in the work area.

Figure 5:
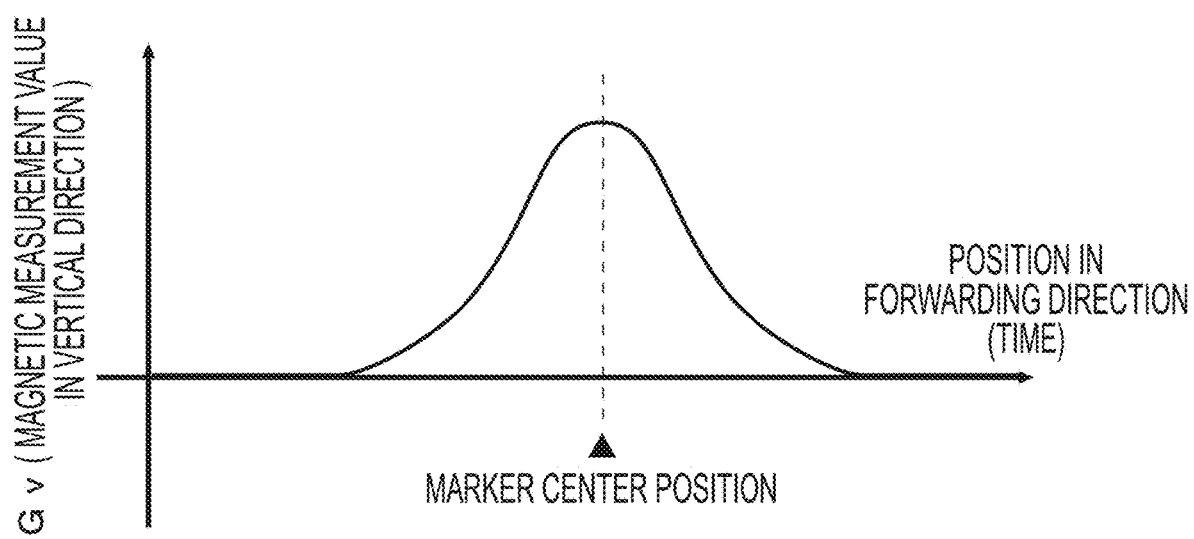
FIG. 5 is a descriptive diagram depicting changes in a forwarding direction of a magnetic measurement value (Gv) in a vertical direction in the first embodiment.

In the forwarding direction when vehicle 5 passes over magnetic marker 10, Gv (magnetic measurement value in the vertical direction) changes as exemplarily depicted in FIG. 5. Gv gradually increases as the vehicle approaches magnetic marker 10, and becomes at its peak when magnetic sensor is positioned directly above magnetic marker 10. Then, Gv gradually degreases as the vehicle goes away from magnetic marker 10. A change curve of Gv in the forwarding direction becomes like a normal distribution curve. Note that the drawing exemplarily represents a case in which the N pole of magnetic marker 10 is oriented upward. A black-filled triangle in the drawing indicates the position of magnetic marker 10 in the forwarding direction, more strictly, the position of the center of magnetic marker 10.

Figure 6:
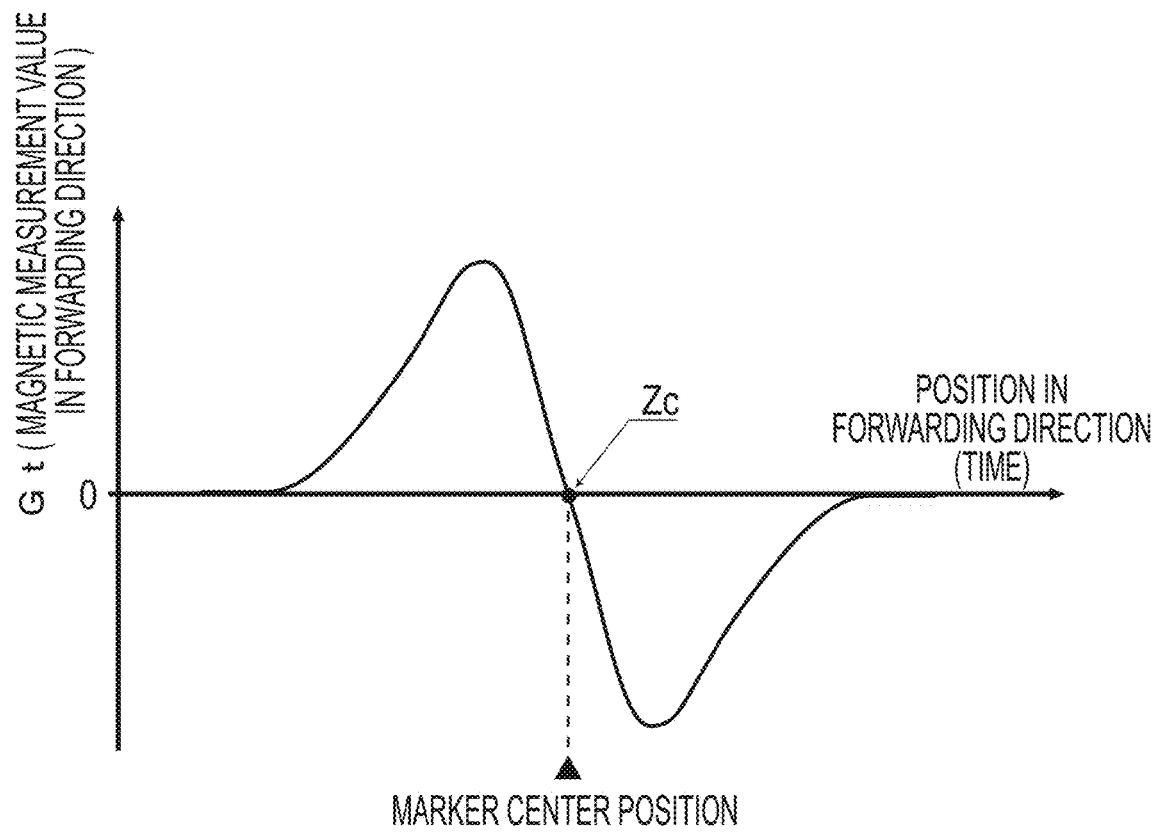
FIG. 6 is a descriptive diagram depicting changes in the forwarding direction of a magnetic measurement value (Gt) in the forwarding direction in the first embodiment.
Figure 7:
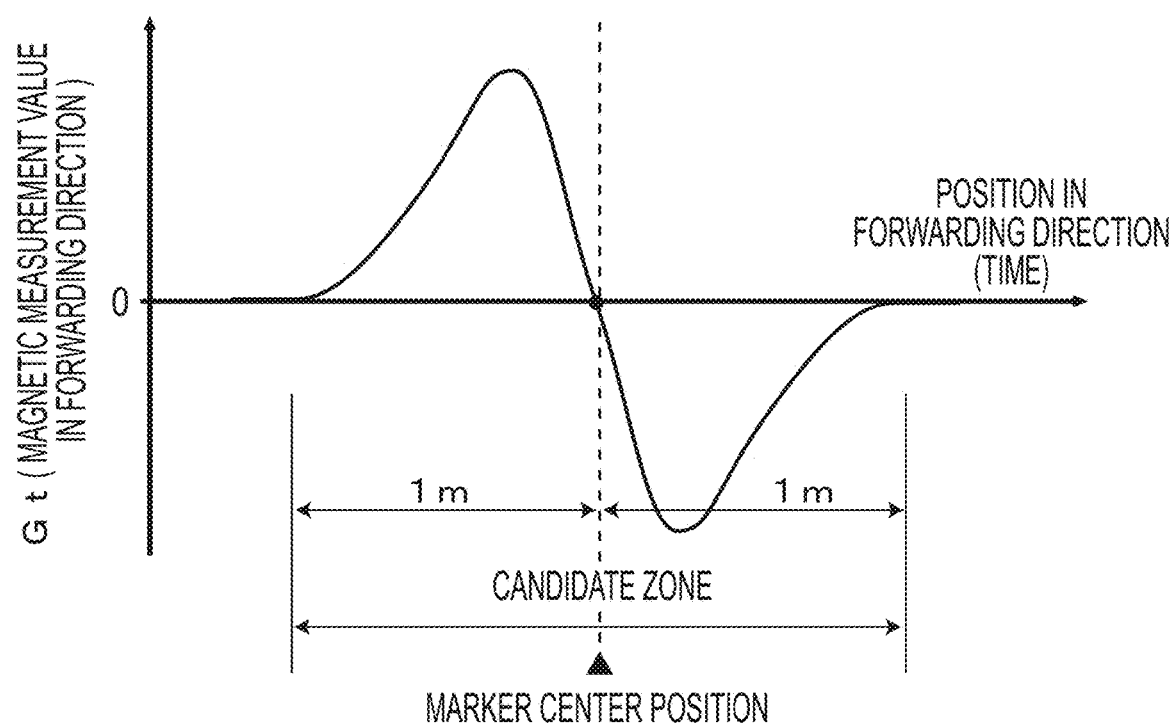
FIG. 7 is a descriptive diagram of a candidate zone in the first embodiment.

Also, in the forwarding direction when vehicle 5 passes over magnetic marker 10, Gt (magnetic measurement value in the forwarding direction) changes as exemplarily depicted in FIG. 6. Gt gradually increases as the vehicle approaches magnetic marker 10, and becomes at its peak on a positive side at a position before magnetic marker 10. When the vehicle further comes closer to magnetic marker 10, Gt gradually degreases and becomes zero when the magnetic sensor is positioned directly above magnetic marker 10. This is because the orientation of the magnetic component in the forwarding direction is reversed on either side of magnetic marker 10. Then, as the vehicle goes away from magnetic marker 10, Gt (absolute value) gradually increases to a negative side to enter its peak. Furthermore, when the vehicle goes away from magnetic marker 10, Gt (absolute value) gradually decreases to approach zero. A change curve of Gt in the forwarding direction becomes, as in FIG. 6, like a curve with two positive and negative peaks being adjacent to each other across magnetic marker 10. In the change curve of Gt, zero-cross Zc crossing zero with a steep gradient occurs directly above magnetic marker 10.

Detection unit 12 first refers to the work area of the RAM described above to read time-series data of Gt of each magnetic sensor Cn (FIG. 6). As described with reference to FIG. 6, when sensor unit 11 reaches directly above magnetic marker 10 while vehicle 5 is traveling, as for the change curve of Gt by the magnetic sensor positioned above magnetic marker 10, zero-cross Zc occurs where its sign is reversed. Detection unit 12 tries to detect zero-cross Zc as for the change curve of Gt by each magnetic sensor Cn (S102). A black-filled triangle in the drawing indicates the position of magnetic marker 10 in the forwarding direction, more strictly, the position of the center of magnetic marker 10.

When zero-cross Zc has been detected (S102: YES), detection unit 12 sets a predetermined zone with reference to the position in the forwarding direction corresponding to zero-cross Zc as a candidate zone to which a possibility that magnetic marker 10 belongs is high (S103). In the present embodiment, as in FIG. 7, with the position of zero-cross Zc taken as a center, a zone 1 m forward and backward that center is set as the candidate zone.

Subsequently, detection unit 12 refers to the work area of the RAM described above to read Gv (magnetic measurement value in the vertical direction) in the candidate zone. Then, as for time-series data of Gv in the candidate zone, a difference between data temporally adjacent to each other is found. This time difference corresponds to temporal differentiation (one example of differentiation process) of Gv of FIG. 5. According to this time difference, the change curve of Gv of FIG. 5 is converted to a change curve exemplarily depicted in FIG. 8. A black-filled triangle in the drawing indicates the position of magnetic marker 10 in the forwarding direction, more strictly, the position of the center of magnetic marker 10.

Figure 8:
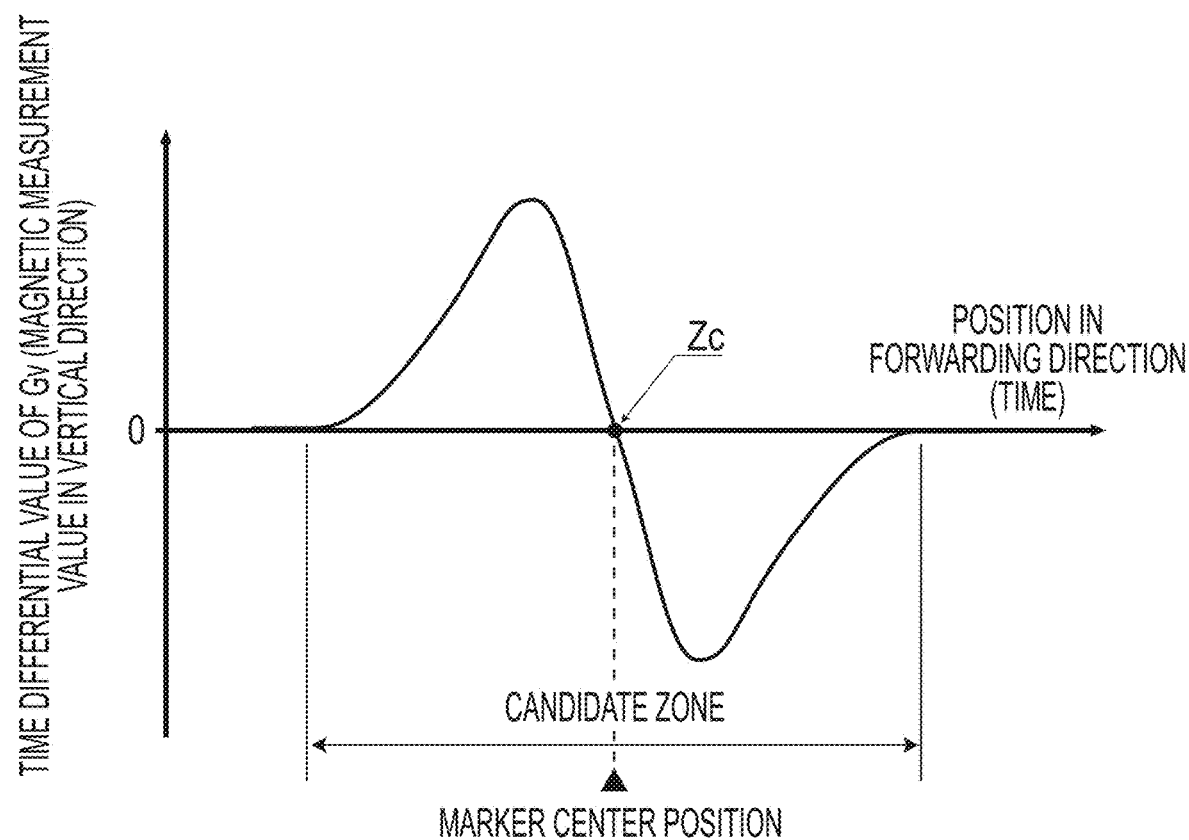
FIG. 8 is a descriptive diagram depicting changes in the forwarding direction of a time differential value of Gv in the first embodiment.

The change curve of the time differential value of Gv of FIG. 8 exhibits the same tendency as that of the change curve of Gt (magnetic measurement value in the forwarding direction) exemplarily depicted in FIG. 6. As with the change curve of FIG. 6, time differential value of Gv of FIG. 8 gradually increases as the vehicle approaches the center position of magnetic marker 10, and becomes at its peak on a positive side before the center position of magnetic marker 10. Furthermore, when the vehicle comes closer to the center position of magnetic marker 10, the time difference of the magnetic measurement value in the vertical direction gradually decreases, and becomes zero when a magnetic sensor is positioned directly above magnetic marker 10. Then, as the vehicle goes away from the center position of magnetic marker 10, Gv (absolute value) gradually increases to a negative side and enters its peak. Furthermore, when the vehicle goes away from magnetic marker 10, the time differential value (absolute value) of Gv gradually decreases to approach zero. As with FIG. 6, a change curve (FIG. 8) of the time differential value of Gv becomes like a curve with two positive and negative peaks being adjacent to each other across the center of magnetic marker 10. In the change curve of the time differential value of Gv, zero-cross Zc crossing zero with a steep gradient occurs directly above magnetic marker 10.

Detection unit 12 finds a correlation coefficient representing a degree of correlation (one example of a degree of synchronization) between the change curve of Gt in the candidate zone set at step S103 described above (first signal, FIG. 7) and the change curve of the time differential value of Gv in that candidate zone (second signal, FIG. 8) by arithmetic operation (S104). Note that to calculate the correlation coefficient, a normalization process of setting the amplitude of the target two change curves at 1 is preferably performed in advance. With the normalization process being performed on the two change curves, a normalization correlation coefficient can be found, with the correlation coefficient becoming 1 at the time of exact match. The correlation coefficient is one example of a numerical value obtained by converting the degree of synchronization between the first signal and the second signal described above into a numerical value.

Detection unit 12 performs a threshold process on the correlation coefficient (normalization correlation coefficient) found at step S104, and determines a degree of synchronization between the change curve of Gt and the change curve of the time differential value of Gv. Specifically, when the above-described normalization correlation coefficient is equal to or larger than 0.8 (S105: YES), detection unit 12 determines that the degree of synchronization between the two change curves described above is high. Then, if the degree of synchronization between the two change curves is high, detection unit 12 determines that magnetic marker 10 has been detected in the candidate zone and confirms the detection result indicating as such (106).

When detection of magnetic marker 10 is confirmed, detection unit 12 measures a lateral shift amount of vehicle 5 with respect to that detected magnetic marker 10 (S107). Then, detection unit 12 outputs the fact that magnetic marker 10 has been detected and the detection result including the lateral shift amount with respect to that magnetic marker 10 as a result of the marker detection process (S108). Note that vehicle ECU 50 achieves driving assist control such as lane keeping traveling by using the detection result outputted by detection unit 12.

Figure 9:
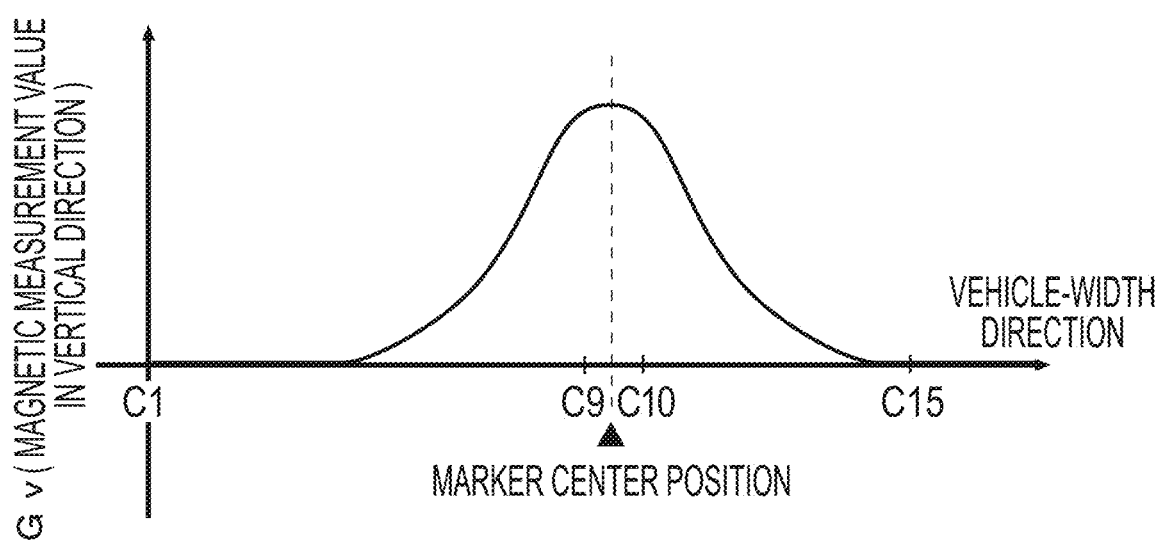
FIG. 9 is a descriptive diagram depicting a change curve (distribution curve) of Gv in a vehicle-width direction in the first embodiment.

Here, a method of measuring the lateral shift amount of vehicle 5 by detection unit 12 is described with reference to FIG. 9 and FIG. 10. For example, a change curve (distribution curve) of Gv (magnetic measurement value in the vertical direction) of each magnetic sensor Cn of sensor unit 11 is, for example, a curve with one peak as depicted in FIG. 9. The peak in this change curve, that is, the peak in the vehicle-width direction, appears so as to correspond to the center position of magnetic marker 10. The black-filled triangle in FIG. 9 and FIG. 10 indicates the position of magnetic marker 10 in the vehicle-width direction, more strictly, the position of the center of magnetic marker 10.

In the present embodiment, as for Gv of each magnetic sensor Cn of sensor unit 11, a difference between the magnetic measurement values by two magnetic sensors adjacent to each other, that is, a magnetic gradient in the vehicle-width direction, is found. A change curve (distribution curve) of the magnetic gradient in the vehicle-width direction is, as exemplarily depicted in FIG. 10, like a curve with positive and negative peaks adjacent to each other via zero-cross Zc. This is because, in the vehicle-width direction, the orientation of magnetism is reversed in accordance with on which side the magnetic sensor is with respect to the center position of magnetic marker 10 to make a switch between a positive magnetic gradient in which magnetism increases and a negative magnetic gradient in which magnetism decreases. Therefore, zero-cross Zc in the drawing appears as corresponding to the center position of magnetic marker 10.

Figure 10:
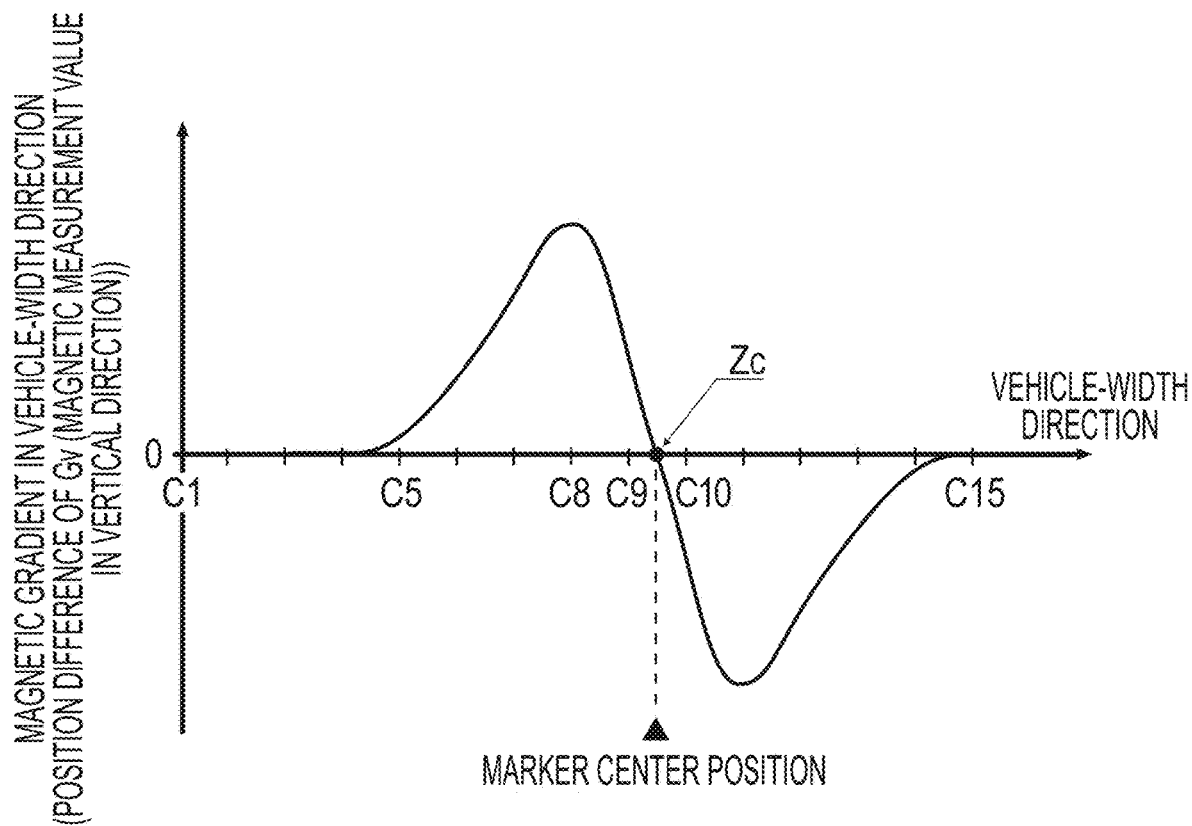
FIG. 10 is a descriptive diagram depicting a change curve (distribution curve) in the vehicle-width direction of a magnetic gradient in the vehicle-width direction in the first embodiment.
Figure 11:
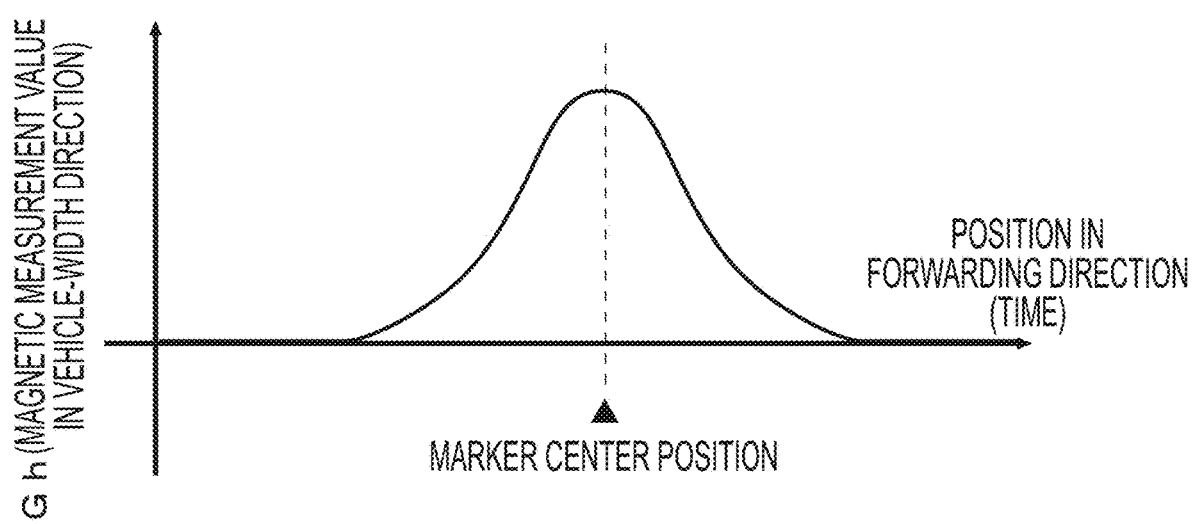
FIG. 11 is a descriptive diagram depicting changes in the forwarding direction of a magnetic measurement value (Gh) in the vehicle-width direction in the first embodiment.

Based on FIG. 10 exemplarily depicting a change curve of the magnetic gradient in the vehicle-width direction, the center position of magnetic marker 10 in the vehicle-width direction can be identified. For example, if zero-cross Zc where the sign of the magnetic gradient in the vehicle-width direction is reversed is positioned in the middle between any two magnetic sensor Cn, that middle position becomes the center position of magnetic marker 10 in the vehicle-width direction. For example, when the magnetic gradient in the vehicle-width direction at the position of a magnetic sensor is zero and the sign of the magnetic gradient in the vehicle-width direction is reversed across the positions of magnetic sensors on both its outer sides, the position directly below the center magnetic sensor is the center position of magnetic marker 10 in the vehicle-width direction.

Detection unit 12 measures a positional deviation of the center position of sensor unit 11 (for example, the position of magnetic sensor C8) with respect to magnetic marker 10 as a lateral shift amount of vehicle 5. For example, in the case of FIG. 10, the position of zero-cross Zc is a position equivalent to C9.5, which is about the middle between C9 and C10. As described above, since the pitch between magnetic sensors C9 and C10 is 10 cm, the lateral shift amount of vehicle 5 with respect to magnetic marker 10 is (9.5-8)×10 cm with reference to C8 positioned at the center of sensor unit 11 in the vehicle-width direction.

As described above, in system 1 of the present embodiment, magnetic marker 10 is detected with high reliability by a combination of the first process of focusing a change of Gt (magnetic measurement value in the forwarding direction) in the forwarding direction and the second process of focusing a degree between synchronization of Gt and Gv (magnetic measurement value in the vertical direction). According to the first process, in accordance with zero-cross Zc where the sign of Gt is reversed, the candidate zone to which a possibility that magnetic marker 10 belongs is high can be set with high reliability in a less-missing manner.

Furthermore, according to the second process, in the candidate zone set by the above-described first process, based on the degree of synchronization between the change of Gt in the forwarding direction and the change of Gv in the forwarding direction, a determination can be made as to whether magnetic marker 10 has been detected in the candidate zone. With the determination made by the second process as to whether magnetic marker 10 has been detected in the candidate zone, even if an erroneous direction is made by the above-described first process, this erroneous detection can be eliminated with high reliability.

Note that in the second process in the present embodiment, the degree of correlation (normalization correlation coefficient) between the change curve of Gt in the forwarding direction (FIG. 7) and the change curve of the time differential value of Gv in the forwarding direction (FIG. 8) is found as a degree of synchronization between the two change curves. In place of this, a degree of synchronization between the change curve of Gt in the forwarding direction (FIG. 7) and the change curve of Gv in the forwarding direction (FIG. 5) may be found to detect magnetic marker 10. As the degree of synchronization, for example, a temporal shift between the time point of zero-cross Zc of the change curve of FIG. 7 and the time point of the peak of the change curve of FIG. 5 may be identified. As the degree of synchronization, a shift between the frequency or period of the change curve of FIG. 7 and the frequency or period of the change curve of FIG. 5 may be identified. Note that when the shift in frequency or period between the change curves is found as the degree of synchronization, a shift in time point, a shift in frequency, a difference in period, a shift in period (phase difference), or the like may be identified between the change curve of FIG. 7 and the change curve of FIG. 8. When finding a shift in time point, a shift in frequency, a difference in period, a shift in period (phase difference) or the like, as the degree of synchronization, for example, by determining whether magnetic marker 10 belongs to the candidate zone by a threshold process regarding a shift amount or a value of a difference, a determination as to whether magnetic marker 10 has been detected can be eventually made.

In the present embodiment, a magnetic sensor capable of measuring a magnetic component in the forwarding direction and a magnetic component in the vertical direction is exemplarily described. A magnetic sensor capable of measuring magnetic components in any two directions among a magnetic component in the forwarding direction, a magnetic component in the vehicle-width direction, and a magnetic component in the vertical direction may be used. For example, when a magnetic sensor capable of measuring a magnetic component in the vehicle-width direction and a magnetic component in the forwarding direction is adopted, a change curve in the forwarding direction of the magnetic measurement value (Gh) in the vehicle-width direction outputted by the magnetic sensor positioned as slightly shifted from magnetic marker 10 in the vehicle-width direction is preferably focused. This change curve is a curve having one peak, as exemplarily depicted in FIG. 11, becoming at its peak when positioned directly beside of magnetic marker 10 and gradually decreasing forward and backward from the position. The change curve exemplarily depicted in FIG. 11 has a similar tendency as that of the change curve of Gv in the forwarding direction of FIG. 5. Therefore, in the case of the change cure of Gt in the forwarding direction and the change curve of Gh in the forwarding direction, the degree of synchronization can be studied with a method nearly similar to the method described in the present embodiment. A black-filled triangle in the drawing indicates the position of magnetic marker 10 in the forwarding direction, more strictly, the position of the center of magnetic marker 10.

Also, magnetic components along the axis in the vertical direction and the axis in the vehicle-width direction, which are axes orthogonal to the forwarding direction, may be measured. For example, in the case of the change curve of Gv in the forwarding direction (FIG. 5) and the change curve of Gh in the forwarding direction (FIG. 11), each of these curves is a curve with one peak, becoming at its peak at the time of passage over magnetic marker 10. With a combination of these change curves, a correlation coefficient can be directly studied. Note that when a candidate zone is set in the first process, a time difference of Gv (FIG. 8) or a time difference of Gh may be found to detect zero-cross.

Furthermore, a magnetic sensor capable of measuring a magnetic component along the axis in the forwarding direction, a magnetic component along the axis in the vehicle-width direction, and a magnetic component along the axis in the vertical direction may be adopted. In this case, by studying a degree of synchronization as to the measurement values of the magnetic components in three directions, accuracy by the above-described second process can be further improved. For example, in addition to obtaining a correlation coefficient between the change curve of Gv in the forwarding direction (FIG. 5, one example of the first signal) and the change curve of Gh in the forwarding direction (FIG. 11, one example of the second signal) as the degree of synchronization, a degree of synchronization between the change curve of Gt in the forwarding direction (FIG. 6, one example of a third signal) and at least any of the change curve of Gv in the forwarding direction (FIG. 5, one example of the first signal) and the change curve of Gh in the forwarding direction (FIG. 11, one example of the second signal) may be obtained. Then, as for these two degrees of synchronization, a threshold process is performed for each, if a positive determination has been made in both of the threshold processes, a determination that magnetic marker 10 has been detected may be made. Here, as for a signal obtained by performing a differentiation process on the change curve of Gv in the forwarding direction (FIG. 5, one example of the first signal) or the change curve of Gh in the forwarding direction (FIG. 11, one example of the second signal), a correlation coefficient with the change curve of Gt in the forwarding direction (FIG. 6, one example of the third signal) may be found as the degree of synchronization.

Note that it is not requisite that a direction of detecting magnetism by the magnetic sensor strictly match any of the forwarding direction, the vehicle-width direction, and the vertical direction. Also, it is not requisite that directions of detecting magnetism by the magnetic sensor be orthogonal to each other. It is only required that plurality of directions of detection (detecting axes) by the magnetic sensor cross each other.

Note that in the present embodiment, a positional zone in the forwarding direction is exemplarily described as a candidate zone to which a possibility that magnetic marker 10 belongs is high. In place of this a temporal zone may be set as a candidate zone. For example, a predetermined period of time including the time point of zero-cross Zc in FIG. 6 may be set as a candidate zone. The predetermine period of time may be changed by, for example, vehicle speed. For example, the predetermined period of time may be a short time on an expressway and may be a long time on a general road with low vehicle speed.

In the foregoing, specific examples of the present invention are described in detail as in the embodiment, these specific examples merely disclose examples of technology included in the scope of the claims. Needless to say, the scope of the claims should not be restrictively construed based on the configuration, numerical values, and so forth of the specific examples. The scope of the claims includes techniques acquired by variously modifying, changing, or combining as appropriate the above-described specific examples by using known techniques, knowledge of a person skilled in the art, and so forth.

REFERENCE SIGNS LIST

1 marker detection system (system)
10 magnetic marker
100 lane (traveling road)
100S road surface
11 sensor unit
Cn magnetic sensor
110 signal processing circuit
12 detection unit (first circuit, second circuit)
5 vehicle
50 vehicle ECU

The invention claimed is:

1. A magnetic marker detection method for detecting, while a vehicle including a magnetic sensor is moving on a traveling road, a magnetic marker laid in or on a road surface forming a surface of the traveling road,
the magnetic sensor capable of measuring magnitudes of magnetic components acting along a plurality of axes including at least two axes, for each of the plurality of axes,
the magnetic marker detection method comprising:
a first process of identifying a candidate zone, which is a temporal or spatial zone to which a possibility that the magnetic marker belongs is high, based on a change in a forwarding direction of the vehicle of a magnitude of a magnetic component along at least any axis of the plurality of axes; and
a second process of determining whether the magnetic marker has been detected in the candidate zone in accordance with a degree of synchronization between a first signal indicating a change of a magnitude of a magnetic component acting along one axis of the at least two axes in the candidate zone and a second signal indicating a change of a magnitude of a magnetic component acting along an other axis in the candidate zone.

2. The magnetic marker detection method in claim 1, wherein, in the second process, the degree of synchronization is converted into a numerical value to perform a threshold process and, when the numerical value indicating the degree of synchronization is equal to or larger than a predetermined threshold, it is determined that the magnetic marker has been detected in the candidate zone.

3. The magnetic marker detection method in claim 2, wherein, the one axis and the other axis are orthogonal to each other.

4. The magnetic marker detection method in claim 2, wherein, while the one axis is an axis in the forwarding direction, the other axis is an axis orthogonal to the forwarding direction, and
the second process is a process of finding a correlation coefficient indicating a degree of correlation between the first signal and a signal obtained by performing a differentiation process on the second signal as a numerical value indicating the degree of synchronization.

5. The magnetic marker detection method in claim 2, wherein the at least two axes are axes orthogonal to the forwarding direction, and
the second process is a process of finding a correlation coefficient indicating a degree of correlation between the first signal and the second signal as a numerical value indicating the degree of synchronization.

6. The magnetic marker detection method in claim 2, wherein the at least two axes are axes orthogonal to the forwarding direction,
the magnetic marker can measure, in addition to the at least two axes, a magnitude of a magnetic component along an axis of the forwarding direction, and
in the second process, in addition to the degree of synchronization between the first signal indicating the change of the magnitude of the magnetic component acting along the one axis of the two axes in the candidate zone and the second signal indicating the change of the magnitude of the magnetic component acting along the other axis in the candidate zone, a degree of synchronization between a third signal indicating a change of the magnitude of the magnetic component acting along the axis of the forwarding direction in the candidate zone and at least either signal of the first signal and the second signal is obtained.

7. The magnetic marker detection method in claim 6, wherein the second process is a process of finding a correlation coefficient indicating a degree of correlation between the first signal and the second signal as a numerical value indicating the degree of synchronization, and finding a correlation coefficient indicating a degree of correlation between a signal obtained by performing a differentiation process on at least either signal of the first signal and the second signal and the third signal as a numerical value indicating the degree of synchronization.

8. The magnetic marker detection method in claim 1, wherein, the one axis and the other axis are orthogonal to each other.

9. The magnetic marker detection method in claim 8, wherein, while the one axis is an axis in the forwarding direction, the other axis is an axis orthogonal to the forwarding direction, and the second process is a process of finding a correlation coefficient indicating a degree of correlation between the first signal and a signal obtained by performing a differentiation process on the second signal as a numerical value indicating the degree of synchronization.

10. The magnetic marker detection method in claim 8, wherein the at least two axes are axes orthogonal to the forwarding direction, and the second process is a process of finding a correlation coefficient indicating a degree of correlation between the first signal and the second signal as a numerical value indicating the degree of synchronization.

11. The magnetic marker detection method in claim 8, wherein the at least two axes are axes orthogonal to the forwarding direction, the magnetic marker can measure, in addition to the at least two axes, a magnitude of a magnetic component along an axis of the forwarding direction, and in the second process, in addition to the degree of synchronization between the first signal indicating the change of the magnitude of the magnetic component acting along the one axis of the two axes in the candidate zone and the second signal indicating the change of the magnitude of the magnetic component acting along the other axis in the candidate zone, a degree of synchronization between a third signal indicating a change of the magnitude of the magnetic component acting along the axis of the forwarding direction in the candidate zone and at least either signal of the first signal and the second signal is obtained.

12. The magnetic marker detection method in claim 11, wherein the second process is a process of finding a correlation coefficient indicating a degree of correlation between the first signal and the second signal as a numerical value indicating the degree of synchronization, and finding a correlation coefficient indicating a degree of correlation between a signal obtained by performing a differentiation process on at least either signal of the first signal and the second signal and the third signal as a numerical value indicating the degree of synchronization.

13. The magnetic marker detection method in claim 1, wherein, while the one axis is an axis in the forwarding direction, the other axis is an axis orthogonal to the forwarding direction, and the second process is a process of finding a correlation coefficient indicating a degree of correlation between the first signal and a signal obtained by performing a differentiation process on the second signal as a numerical value indicating the degree of synchronization.

14. The magnetic marker detection method in claim 1, wherein the at least two axes are axes orthogonal to the forwarding direction, and the second process is a process of finding a correlation coefficient indicating a degree of correlation between the first signal and the second signal as a numerical value indicating the degree of synchronization.

15. The magnetic marker detection method in claim 1, wherein the at least two axes are axes orthogonal to the forwarding direction, the magnetic marker can measure, in addition to the at least two axes, a magnitude of a magnetic component along an axis of the forwarding direction, and in the second process, in addition to the degree of synchronization between the first signal indicating the change of the magnitude of the magnetic component acting along the one axis of the two axes in the candidate zone and the second signal indicating the change of the magnitude of the magnetic component acting along the other axis in the candidate zone, a degree of synchronization between a third signal indicating a change of the magnitude of the magnetic component acting along the axis of the forwarding direction in the candidate zone and at least either signal of the first signal and the second signal is obtained.

16. The magnetic marker detection method in claim 15, wherein the second process is a process of finding a correlation coefficient indicating a degree of correlation between the first signal and the second signal as a numerical value indicating the degree of synchronization, and finding a correlation coefficient indicating a degree of correlation between a signal obtained by performing a differentiation process on at least either signal of the first signal and the second signal and the third signal as a numerical value indicating the degree of synchronization.

17. A system for a vehicle including a magnetic sensor to detect a magnetic marker laid in or on a road surface forming a surface of a traveling road, the magnetic sensor capable of measuring magnitudes of magnetic components acting along a plurality of axes including at least two axes, for each of the plurality of axes, the system comprising:

a first circuit which identifies a candidate zone, which is a temporal or spatial zone to which a possibility that the magnetic marker belongs is high, based on a change in a forwarding direction of the vehicle of a magnitude of a magnetic component along at least any axis of the plurality of axes; and a second circuit which determines whether the magnetic marker has been detected in the candidate zone in accordance with a degree of synchronization between a first signal indicating a change of a magnitude of a magnetic component acting along one axis of the at least two axes in the candidate zone and a second signal indicating a change of a magnitude of a magnetic component acting along an other axis in the candidate zone.

18. The system in claim 17, wherein the second circuit converts the degree of synchronization into a numerical value to perform a threshold process and, when the numerical value indicating the degree of synchronization is equal to or larger than a predetermined threshold, determines that the magnetic marker has been detected in the candidate zone.

* * * * *